United States Patent [19]

Mulvany, Jr.

[11] 4,088,718
[45] May 9, 1978

[54] METHOD FOR FORMING INVOLUTE PLASTIC ARTICLES FROM THERMOPLASTIC SHEET MATERIAL

[76] Inventor: R. F. Mulvany, Jr., P.O. Box 1812, Sausalito, Calif. 94965

[21] Appl. No.: 681,993

[22] Filed: Apr. 30, 1976

Related U.S. Application Data

[63] Continuation of Ser. No. 335,401, Feb. 23, 1973, abandoned.

[51] Int. Cl.² .............................................. B29C 17/04
[52] U.S. Cl. ..................................... 264/25; 264/40.6; 264/94; 264/327; 425/143; 425/145; 425/174.4; 425/387.1
[58] Field of Search .................. 264/89, 90, 92, 93, 264/94, 25, 40.6, 292, 322, 323, 327; 425/174.4, 384, 387 R, 388, 143, 145, 150, 387.1; 219/400, 405, 411; 215/1 C

[56] References Cited

U.S. PATENT DOCUMENTS

| | | | |
|---|---|---|---|
| 2,452,999 | 11/1948 | Daly et al. | 264/292 X |
| 2,531,539 | 11/1950 | Smith | 425/387 X |
| 2,749,572 | 6/1956 | Nowak | 264/92 |
| 2,919,338 | 12/1959 | Covault et al. | 219/400 UX |
| 3,159,695 | 12/1964 | Behringer | 264/92 X |
| 3,329,801 | 7/1967 | Shannon et al. | 219/400 X |
| 3,349,153 | 10/1967 | Beck | 264/93 X |
| 3,484,518 | 12/1969 | Ignell | 264/327 X |
| 3,488,414 | 1/1970 | Naples | 264/92 |
| 3,726,953 | 4/1973 | Jones et al. | 264/92 X |
| 3,757,718 | 9/1973 | Johnson | 264/292 X |
| 3,814,562 | 6/1974 | Diamond | 425/174.4 |

*Primary Examiner*—Jan H. Silbaugh
*Attorney, Agent, or Firm*—Townsend and Townsend

[57] ABSTRACT

A method for forming elongated and involute thermoplastic articles is disclosed. Means are provided for controllably heating a sheet of thermoplastic material to form preselected temperature gradients throughout the sheet of thermoplastic material. Means are further provided for planarly supporting the heated sheet of thermoplastic material allowing for transverse motion of the heated sheet of thermoplastic material at the center thereof and further allowing for controlled slippage of the heated sheet of thermoplastic material toward said center thereof relative to the planar support means. Means are also provided for transversely forming a heated sheet of thermoplastic material into the shape of an elongated or involute plastic article. A plug is used to extend the heated sheet of thermoplastic material into an elongated conical shaped piece. To form involute thermoplastic articles, the elongated conical shaped piece is formed inside an involute female mold, and air is introduced into the interior cavity of the elongated conical shaped piece to expand and press the material against the interior surface of the mold.

14 Claims, 6 Drawing Figures

U.S. Patent   May 9, 1978   Sheet 1 of 2   4,088,718
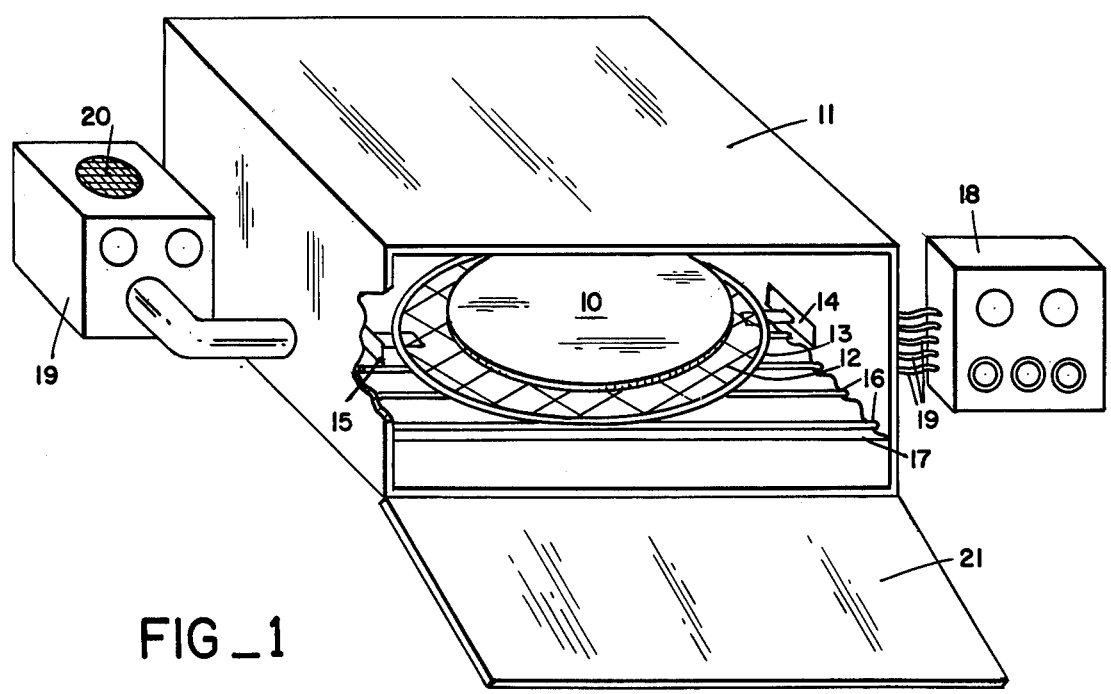
FIG_1
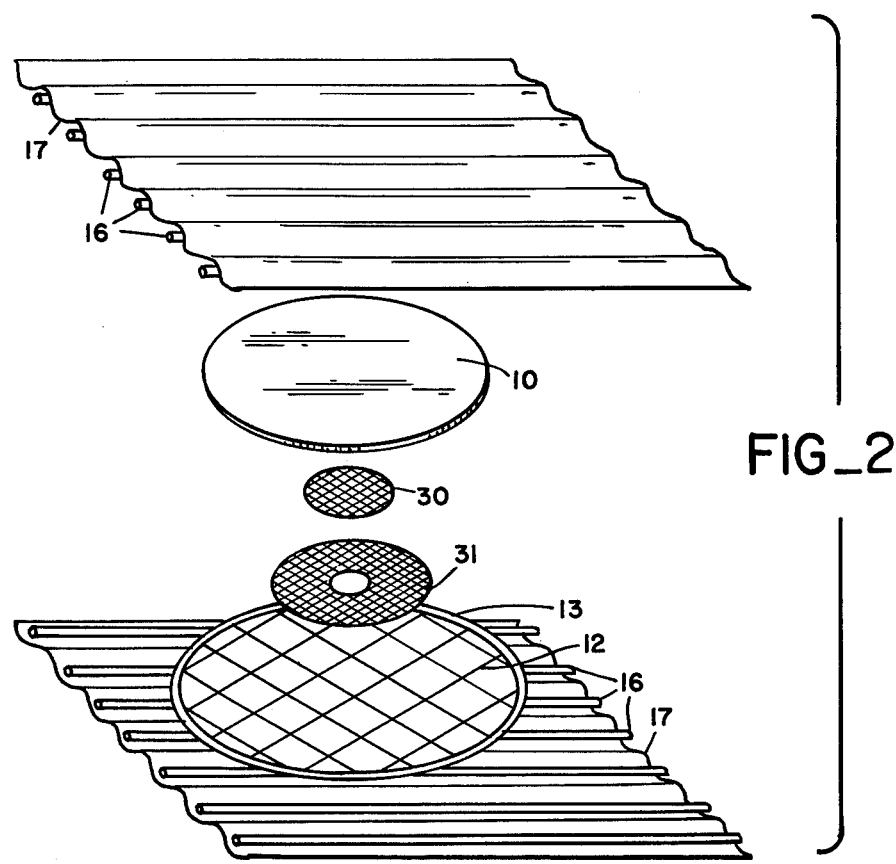
FIG_2

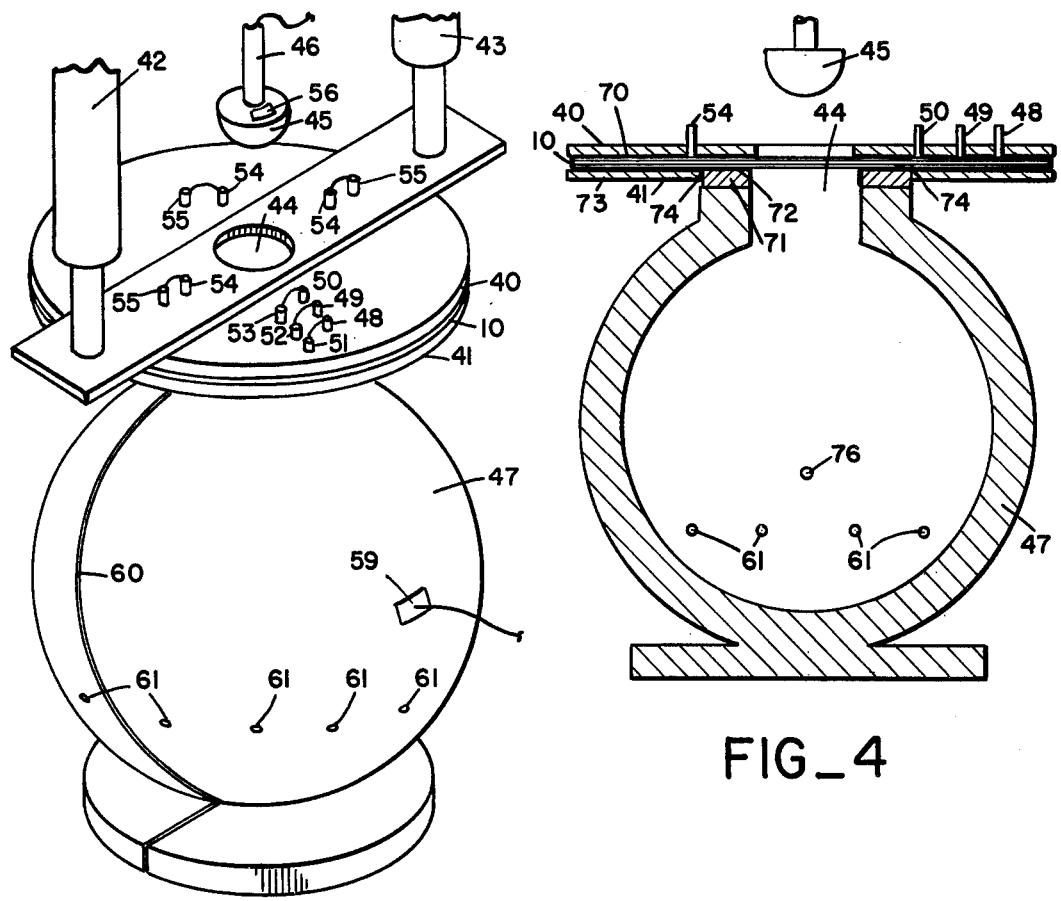
FIG_3
FIG_4
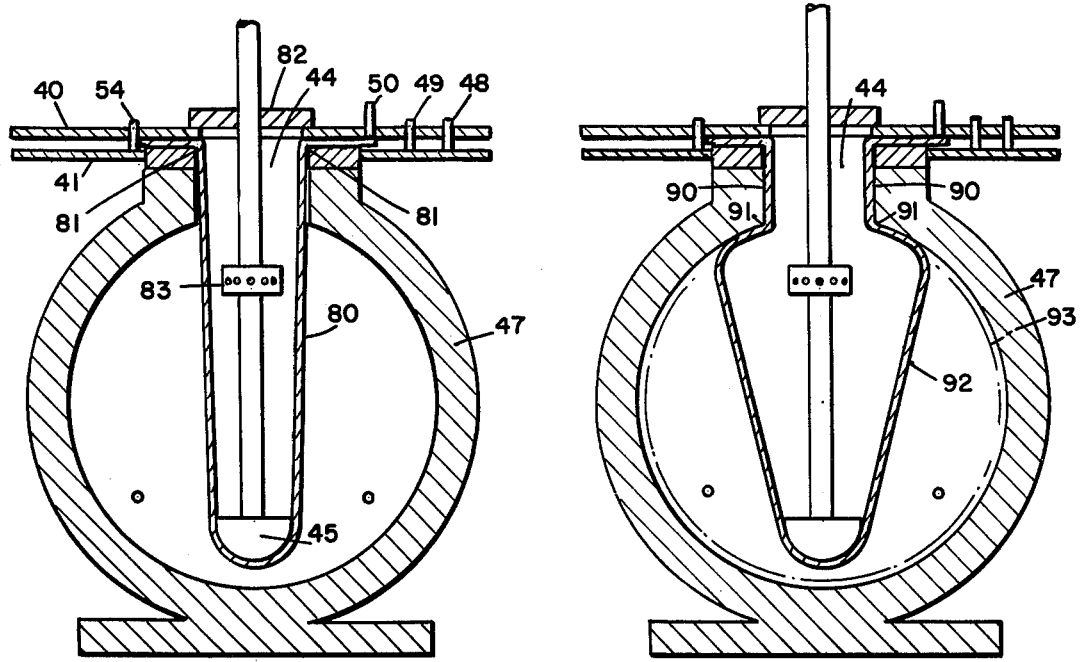
FIG_5
FIG_6

METHOD FOR FORMING INVOLUTE PLASTIC ARTICLES FROM THERMOPLASTIC SHEET MATERIAL

This is a continuation of application Ser. No. 335,401, filed Feb. 23, 1973, now abandoned.

BACKGROUND OF THE INVENTION

1. Field of the Invention

The invention relates to a method for forming involute or elongate plastic articles from a sheet of thermoplastic material.

2. Description of the Prior Art

Current methods of forming thermoplastic material have certain basic deficiencies which restrict their utility in forming involute or elongate articles. Involute plastic structures, i.e., structures having a neck smaller than an interior cross-section, are generally formed by bonding two or more separately formed pieces of material together, rather than forming the article from a single piece, and the seam or joint required degrades the optical properties of the article. Injection blow molding can be used to form thermoplastic articles, but this method is limited to relatively small articles due to the magnitude of the equipment involved. Extrusion blow molding can also be used to form thermoplastic articles, but the closure on the end opposite the opening forms objectionable marks and loss of optical properties.

The present invention discloses a method for forming elongated and involute articles from thermoplastic material having a variety of novel and innovative features which overcome deficiencies in the methods used to date. The invention provides a methodology for accurate control of the heating of a sheet of thermoplastic material, and the establishment of preselected concentric temperature zones within the thermoplastic material, to facilitate subsequent formation of the articles. The thermoplastic material is rapidly heated so that the material forms easily without unwanted stretching. After the sheet of thermoplastic material is heated, it is placed in a device for forming the thermoplastic material to the desired shape. The heated sheet of thermoplastic material is planarly supported by the device and held in accurately monitored compression to control slippage of the material toward the center thereof. A plug is used to project the center of the sheet of thermoplastic material through an aperture in the planar support, and the material "self-forms" around a sharp corner on the interior of the aperture into an elongated shape. The planar support disclosed herein also provides a means for inducing axial stress in the sheet of material to control the thickness of the thermoplastic material as it is formed from the flat sheet into the elongated piece.

In the formation of involute articles, the elongated piece is formed within an involute female mold. The involute female mold disclosed herein has a flat aperture section forming the entrance to the mold, and a sharp corner is provided at the junction of the flat aperture section and the interior surface of the female mold to eliminate potential formation of stress cracks. The ambient environment of the thermoplastic material as it is elongated is closely controlled to prevent cooling of the material below its forming temperature so that it can be expanded within the mold by injection of pressurized air into the interior cavity of the elongate piece. As the material expands, the concentric temperature zones control relative expansion of different areas of the material so that the final article has controlled and approximately uniform wall thickness.

SUMMARY OF THE INVENTION

The invention provides an infrared oven with voltage and ambient temperature controls to rapidly and accurately heat a sheet of thermoplastic material. During the heating of the thermoplastic material, metallic screens are interposed between the oven heating elements and the thermoplastic material to establish radial temperature gradients in the material. After the sheet of thermoplastic material has been heated, it is placed between a pair of opposed platens which provide planar support. The pair of opposed platens have apertures through the centers thereof to allow for transverse extension of the thermoplastic material and allow for controlled slippage of the thermoplastic material toward the center thereof. A heated plug is used to transversely extend the thermoplastic material into an elongated conical piece. During the elongation process, the thermoplastic material "self-forms" as it translates from between the pair of opposed platens into the elongated shape, and a small radius corner must be provided at this junction to properly allow the material to self-form.

If involute articles are to be formed, the elongated conical shaped piece is formed within an involute female mold, and compressed air is injected into the interior cavity of the elongated conical shaped piece to expand and press the thermoplastic material against the surface of the mold. Proper design of the entrance of the involute female mold and proper maintenance of the temperature gradients in the thermoplastic material are essential for the proper formation of an involute article without optical defects. Throughout the entire process, maintenance of the proper ambient conditions and structural details of the forming mechanism are essential for proper operation of the process.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the apparatus used for heating the sheet of thermoplastic material.

FIG. 2 is an exploded view of the interior of the heating apparatus.

FIG. 3 is a perspective view of the apparatus used to elongate and form the involute plastic articles.

FIG. 4 is a cross-sectional elevation view of the apparatus illustrated in FIG. 3 showing the sheet of thermoplastic material in position to be formed.

FIG. 5 is the cross-sectional elevation view of FIG. 4 after the sheet of thermoplastic material has been formed into an elongated conical shaped piece.

FIG. 6 is the cross-sectional elevation view illustrated in FIGS. 4 and 5 after the elongated conical shaped piece of thermoplastic material has been partially formed into an involute plastic article.

DESCRIPTION OF THE PREFERRED EMBODIMENTS

Referring to FIG. 1, a circular sheet of thermoplastic material 10 is mounted inside an oven enclosure 11. The circular sheet of thermoplastic material 10 is supported on a grid 12 of very fine, widely-spaced wires which are attached to a rotatable ring 13. The rotatable ring 13 is mounted on brackets 14 and 15 attached to the side of the oven enclosure 11. In this manner, contact of the mounting structure with the sheet of thermoplastic material is minimized, and only the thin wires are interposed between the thermoplastic material and the heating mechanism.

The sheet of thermoplastic material 10 is heated by means of linear infrared heating elements 16. An array of heating elements is disposed adjacent both the top and the bottom faces of the thermoplastic material 10, but the upper array is hidden in the perspective view of FIG. 1. A scalloped reflecting structure 17 is used to direct the radiant heat from the infrared heating elements 16 in the direction of the thermoplastic material 10. Potential heating irregularities due to the linear nature of the array are compensated for by rotating the sheet of thermoplastic so that the heating is concentrically uniform.

In the present invention, it is absolutely essential that the heating of the sheet of thermoplastic material 10 be accurately and precisely controlled, since only slight deviations from the desired heating will seriously degrade the integrity of the entire forming process. Hence, a voltage regulator 18 is used to provide a precisely controlled and constant input voltage to the linear infrared heating elements 16 through leads 19. However, the heat loss or gain of the sheet of thermoplastic material 10 and the radiant output of the heating elements 16 is dependent on the ambient air temperature within the oven enclosure 11. Therefore, it is not sufficient to merely control the input voltage to the heating element 16 in order to accurately control the heating of the sheet of thermoplastic material 10, but the ambient air temperature within the oven enclosure 11 must also be controlled. Such control is provided by a venting mechanism which exhausts heated air out vent 20. The venting mechanism 19 controls the venting of air and maintains the ambient temperature of the air inside the oven enclosure 11 at a constant temperature. The door 21 to the oven enclosure 11 does not fully seal off the enclosure, but rather provides for a slight intake of air to compensate for the heated air vented through the exhaust vent 20. By accurately and precisely controlling the radiant heating of the sheet of thermoplastic material 10, the process becomes very repeatable and provides constant quality control of the end product.

To control subsequent formation of the material, it is not sufficient to control only the general heating of the sheet of thermoplastic material 10, but it is also desirable to set up various temperature gradients throughout the thermoplastic material. FIG. 2 is an exploded view illustrating the sheet of thermoplastic material 10 separated from its support grid 12 of thin, widely spaced wires attached to ring 13. Both the upper and lower arrays of linear infrared heating elements 16 with their scalloped reflecting structures 17 are illustrated. The mechanism for mounting and rotating the ring 13 is not illustrated in FIG. 2. To establish radial temperature gradients in the sheet of thermoplastic material 10, concentric rings of metallic screen 30 and 31 are interposed between the sheet of thermoplastic material 10 and the support grid 12. Although shown separately in the exploded view, in actual operation they are positioned one on top of the other. In the Figure, two concentric rings of metallic screen are illustrated for simplicity, but in practice a multitude of concentric rings of metallic screen are normally utilized, with some rings having internal cutout sections as in concentric ring 31 and some without such cutouts as in concentric ring 30. The purpose of the concentric rings of metallic screen is to block a portion of the radiant energy from the infrared heating elements 16 to prevent it from reaching the sheet of thermoplastic material 10. Since the metallic screen is formed in concentric rings a set of radial temperature gradients will be established.

The heating apparatus is designed to heat the sheet of thermoplastic material 10 such that the edge of the sheet is heated to a greater extent than the central area of the sheet. Concentric heat zones are formed by the metallic screens so that the center is heated to a temperature near the low end of the forming temperature range, the edge is heated to a temperature near the high end of the forming temperature range, with possible intermediate zones between the center and the edge.

A key element in the heating apparatus is the rapidity of the heating process. Due to the short duration of the heating cycle, the surfaces of the thermoplastic material 10 are heated to temperatures at or above the minimum forming temperature of the plastic while the center plane of the material is heated just to the minimum forming temperature. Thus the material can readily be bent and shaped as desired, but will resist excessive thinning and stretching during the shaping process. The center plane then becomes heated as heat is slowly conducted from the surfaces of the material to the center to facilitate subsequent expansion of the material as will hereinafter be more fully illustrated.

After the sheet of thermoplastic material 10 is heated, it is immediately transferred to the forming apparatus illustrated in FIG. 3 and placed between a pair of opposed platens consisting of an upper platen 40 and a lower platen 41. The upper platen 40 is attached to air actuators 42 and 43 which control the compression that the pair of opposed platens 40 and 41 maintain on the heated sheet of thermoplastic material 10. An aperture 44 is formed through the upper platen 40 and the lower platen 41 whereby the center of the heated sheet of thermoplastic material 10 is exposed. A plug 45 mounted on shaft 46 is passable through the aperture 44 through the pair of opposed platens 40 and 41 to form the heated sheet of thermoplastic material into an elongated conical shaped piece. The elongated conical shaped piece is formed within an involute female mold 47 if involute articles are to be produced. If merely elongated conical articles are to be produced, the involute female mold 47 is not necessary.

During the formation of the elongated conical shaped piece of thermoplastic material, it is desirable to gradually increase the compression of the pair of opposed platens 40 and 41 on the sheet of thermoplastic material 10 to prevent flange wrinkling and to control slippage of the thermoplastic material relative to the pair of opposed platens. The preferred method of controlling the increase in compression is by means of a closed loop control system wherein the pressure exerted by air actuators 42 and 43 is increased based on the amount of thermoplastic material which has been used in the forming process. To provide such a closed loop control system, a row of thermoinsulative pegs 48, 49 and 50 is provided which are placed in a row of radially disposed holes on the upper platen 40. As the edge of the sheet of thermoplastic material 10 moves in the direction of the aperture 44 during the formation process, switches 51, 52 and 53 attached to the pegs 48, 49 and 50 are successively actuated by the falling of the pegs through the holes to monitor the movement of the thermoplastic material toward the aperture. The switches successively increase the pressure exerted by air actuators 42 and 43 whereby the compression exerted by the pair of opposed platens 40 and 41 is gradually increased.

A plurality of pegs 54 are located in a ring of holes in the upper platen 40 disposed about the aperture 44. Switches 55 are connected to the pegs 54, and the interior peg 50 and connecting switch 53 of the radically disposed row of pegs form part of the ring. The ring of pegs is adapted to cause the air actuators 42 and 43 to exert sufficient pressure to clamp the heated sheet of thermoplastic material 10 between the pair of opposed platens 40 and 41 to prevent any slippage of the thermoplastic material relative to the opposed platens. Any one of the ring of pegs 54 and 50 will activate the clamping procedure so that no part of the edge of the sheet of thermoplastic material 10 can enter the aperture 44.

In order to control the exact temperature of the sheet of thermoplastic material 10 at all times, parts of the apparatus which come into direct contact with the thermoplastic material are heated. A heater 56 is attached to the plug 45, and a heater 59 is also attached to the involute female mold 47. Portions of the apparatus which are actively heated, i.e., the plug 45, and the mold 47, are constructed of thermoconductive material to evenly distribute the heat throughout the structure.

The involute female mold 47 can be split along seam 60 so that it can be divided into sections. Air holes 61 are provided to allow for exhaust of air from the interior of the mold 47 during the forming process.

The actual formation of the involute plastic articles can be more fully illustrated by viewing FIGS. 4, 5, and 6 in series. FIG. 4 illustrates the heated sheet of thermoplastic material 10 in position between the upper platen 40 and the lower platen 41. The plug 45 is in the raised position above the aperture 44 through the pair of opposed platens 40 and 41. Pegs 48, 49, 50 and 54 are in abutment with the sheet of thermoplastic material 10 and are thus maintained in position.

The upper platen 40 is composed of thermoconductive material, but has a coating of thermoinsulative material 70 on the face adapted to contact the heated sheet of thermoplastic material 10. The lower platen 41 is composed of an interior annular section 71 of thermoconductive material which is coated by a layer of thermoinsulative material 72 on the faces of the lower platen adapted to contact the heated sheet of thermoplastic material 10. Teflon is preferably used as the thermoinsulative material since it facilitates slippage of the thermoplastic material relative to the platens. The exterior section of the lower platen 41 is mounted circumferentially about the periphery of the interior annular section 71, and is preferably composed of semi-rigid thermoinsulative material such as wood. The exterior section 73 is slightly depressed relative to the interior section 71 such that a slight lip 74 is formed on the surface of the lower platen 41 at the junction between the interior section 71 and the exterior section 73. The slight lip 74 allows control of slippage through pressure without compressing the entire sheet of thermoplastic material.

If involute plastic articles are to be formed, the interior section 71 of the lower platen 41 is preferably attached directly to an involute female mold 47 such that the aperture 44 through the lower platen 41 forms the entrance opening to the female mold. The involute female mold illustrated in FIG. 4 is basically spherical, but the methodology illustrated herein is applicable to any shape wherein the neck of the article is smaller than an interior cross-section, i.e., wherein the article is involute, as well as to tapered, i.e. non-involute articles. The mold 47 has holes 61 therein adapted to allow for exit of air from the interior of the mold during formation of the articles. In addition, a sensor 76 is mounted on the interior surface of the involute female mold 47 and is adapted to sense contact of the thermoplastic material with the interior surface of the involute female mold to indicate that the formation of the article is completed.

Formation of the elongated conical shaped piece is illustrated by way of reference to FIG. 5. The outer diameter of the plug 45 with the thermoplastic material thereon is smaller than the interior diameter of the aperture 44 so that the thermoplastic material is not compressed between the plug and the walls of the aperture. Hence, the thermoplastic material "self-forms" as it translates from between the pair of opposed platens 40 and 41 into the aperture 44. Due to the self-forming nature of the process, the construction of the corner 81 over which the elongated conical shaped piece 80 self-forms is critical. Normal molding technology would dictate that a large radius corner by used to alleviate friction. However, one of the principal features of the invention disclosed herein is that a relatively sharp, small radius corner as illustrated is far preferable to a large radius corner.

In the formation of the elongated conical shaped piece 80, the thermoplastic material is drawn radially inwardly toward the aperture 44 as the plug 45 extends the material. As the edge of the heated sheet of thermoplastic material is drawn toward the aperture, the thermoinsulative pegs 48 and 49 successively fall whereby the compression exerted by the pair of opposed platens 40 and 41 on the thermoplastic material is increased. When the edge of the thermoplastic material is sufficiently close to the aperture so that one of the pegs 54 or 50 in the interior ring falls, sufficient compression is exerted by the pair of opposed platens to clamp the thermoplastic material in place between the platens.

The plug 45 extends to such a depth that the tip of the elongated conical shaped piece 80 is substantially adjacent the interior surface of the involute female mold 47 opposite the entrance opening 44. A lid 82 is mounted on the shaft 46 which holds the plug 45 and is adapted to fit over the aperture through the upper platen 40 whereby the interior cavity of the elongated conical shaped piece 80 is sealed. Hence, pressurized air can be introduced through nozzle 83 also located on shaft 46 in order to form the desired involute plastic article. The sequence of operations illustrated by FIGS. 4 and 5 are performed in a relatively short amount of time so as to prevent substantial cooling of the thermoplastic material. Hence, the elongated conical shaped piece 80 basically retains the temperature configuration imparted to it during the heating process. However, to facilitate formation of the involute article, the surface heat of the material is allowed to conduct to the center plane so that the material will more readily stretch when pressurized. The temperature zones remain basically unaffected.

As air is injected into the interior cavity of the elongated conical shaped piece, the walls of thermoplastic material do not expand simultaneously, but the formation of the article proceeds in various steps. The initial step in the formation of the involute plastic article is illustrated in FIG. 6. The first formation takes place in the area of the entrance to the involute female mold 47 as illustrated by contour 92. Since the original temperature zones established in the heating process has been maintained, thermoplastic material which was near the edge of the original sheet of thermoplastic material is at a greater temperature than material intermediate the edge and the center. The thermoplastic material which was adjacent the edge of the original sheet of thermoplastic material is now adjacent the entrance opening 44 of the involute female mold 47, and due to its greater temperature forms first. The thermoplastic material in the region of the entrance 44 to the involute female mold 47 comes into contact with the entrance opening and the interior surface of the female mold adjacent the entrance opening as air is first injected into the cavity. Although the involute female mold is heated, it is heated to a lesser temperature than the thermoplastic material, so that the thermoplastic material is cooled rapidly by the relative temperature differential when it comes in contact with the thermoconductive surface of the mold. Hence, the shape of the junction between the flat surface 90 and the interior surface of the female mold 47 is critical. The invention provides for a small radius corner 91 at this junction, rather than a large radius corner as would be expected, together with a vertical surface 90 of thermoconductive material at the entrance to the mold. As compressed air is introduced through nozzle 83, the hot plastic first contacts the vertical surface 90 and immediately cools. This prevents further slippage and eliminates stress cracking during the balance of the forming process.

It is apparent from FIG. 6 that the initial expansion, which took place near the entrance opening 44, is in a region wherein the material has only a short distance to travel before reaching the interior surface of the mold 47. Hence, the portion of thermoplastic material which is heated more than other portions has the shortest distance to travel to reach the interior surface of the mold. The thermoplastic material which was less heated has a relatively long distance to travel before it reaches the interior surface of the mold 47 in its final form as illustrated by the dashed contour 93. In this manner, the material which has the shortest distance to go stretches most rapidly, and the end result is the formation of an involute thermoplastic article with controlled wall thickness.

What is claimed is:

1. A method for forming involute plastic articles comprising:
    heating a sheet of thermoplastic material in a controlled manner so as to maintain proper ambient conditions;
    planarly supporting the heated sheet of thermoplastic material by placing the material between opposed platens which allow for transverse movement of the center of said heated sheet of thermoplastic material with respect to said platens, the compression between said opposed platens generally allowing for controlled planar movement of the thermoplastic material radially inwardly towards the center thereof;
    transversely extending the center of the heated sheet of thermoplastic material into the interior of an involute female mold so that said material is drawn radially inwardly between the platens toward the center of the sheet and extended transversely at said center into an elongate conical shaped piece having an interior cavity;
    monitoring the movement of the thermoplastic material radially inwardly toward the center of said sheet;
    increasing the compression between the opposed platens responsively to said monitoring so that said compression is increased responsively to the movement of the thermoplastic material as the material moves radially inwardly toward the center thereof; and
    pressurizing the interior cavity of the elongate conical shaped piece of thermoplastic material without substantially reheating said material to expand and press the thermoplastic material against the interior surface of the involute female mold.

2. A method as recited in claim 1 wherein said increasing step includes clamping the thermoplastic material between the platens to prevent continued radially inward movement thereof responsive to movement of the material a preselected distance toward the center.

3. A method as recited in claim 1 wherein said heating comprises the steps of placing the sheet of thermoplastic material in an oven between opposed infrared heating elements, heating the sheet of thermoplastic material with said infrared heating elements, and controlling the ambient temperature within the oven during said heating to control the heat loss and gain of the thermoplastic material.

4. A method for forming involute plastic articles comprising:
    placing a sheet of thermoplastic material in an oven between opposed infrared heating elements;
    heating the sheet of thermoplastic material with said infrared heating elements;
    controlling the ambient temperature within the oven during said heating to control the heat loss and gain of the thermoplastic material;
    planarly supporting the heated sheet of thermoplastic material allowing for transverse movement of the center of said heated sheet of thermoplastic material and for controlled planar movement of the thermoplastic material towards the center thereof;
    monitoring the movement of the thermoplastic material radially inwardly toward the center of said sheet;
    increasing the compression between the opposed platens responsively to said monitoring so that said compression is increased responsively to the movement of the thermoplastic material as said material moves radially inwardly toward the center thereof; and
    transversely extending the center of the heated sheet of thermoplastic material into the interior of an involute female mold so that said material is drawn radially inwardly between the platens toward the center of the sheet and extended transversely at said center into an elongate conical shaped piece having an interior cavity;
    pressurizing the interior cavity of the elongate conical shaped piece of thermoplastic material without substantially reheating said material to expand and press the thermoplastic material against the interior surface of the involute female mold.

5. A method as recited in claim 4 wherein said heating includes forming concentric heat zones in the sheet of thermoplastic material, said zones comprising at least a central temperature zone adjacent the center of said sheet heated to a temperature at the low end of the forming temperature range of said material, and an exterior temperature zone adjacent the edge of said sheet heated to a temperature at the high end of the forming temperature range of said material, so that during the pressurization of said material the exterior temperature zone enhances expansion of said material adjacent the entrance of the mold and the central temperature zone inhibits expansion of said material proximate the center and sides of said mold so that the thickness of said material is controlled.

6. A method as recited in claim 4 wherein said controlling step comprises the steps of simultaneously drawing air from outside the oven into the oven, venting heated air from the oven, and controlling said venting to control the heat loss and gain of the thermoplastic material.

7. A method as recited in claim 4 wherein said controlling step includes the step of maintaining a constant ambient temperature within the oven during said heating.

8. A method for forming involute plastic articles comprising:
  placing a sheet of thermoplastic material in an oven between opposed arrays of infrared heating elements;
  heating the sheet of thermoplastic material with said infrared heating elements;
  simultaneously drawing air from outside the oven into the oven, venting heated air from the oven, and controlling said venting to control the heat loss and gain of the thermoplastic material;
  planarly supporting the heated sheet of thermoplastic material by compressing the material between opposed platens which allow for transverse movement of the center of said heated sheet of thermoplastic material with respect to said platens, the compression between said opposed platens generally allowing for control planar movement of the thermoplastic material radially inwardly toward the center thereof;
  transversely extending the center of the heated sheet of thermoplastic material into the interior of an involute female mold so that said material is drawn radially inwardly between the platens towards the center of the sheet and extended transversely at said center into an elongate conical shaped piece having an interior cavity;
  monitoring the movement of the thermoplastic material radially inwardly toward the center of said sheet;
  increasing the compression between the opposed platens responsively to said monitoring so that said compression is increased responsively to the movement of the thermoplastic material as said material moves radially inwardly toward the center thereof; and
  pressurizing the interior cavity of the elongate conical shaped piece of thermoplastic material without substantially reheating said material to expand and press the thermoplastic material against the interior surface of the involute female mold.

9. A method for forming involute plastic articles comprising:
  heating a sheet of thermoplastic material in a controlled manner so as to maintain proper ambient conditions;
  planarly supporting the heated sheet of thermoplastic material by compressing said material between opposed platens which allow for transverse movement of the center of said heated sheet of thermoplastic material with respect to said platens;
  transversely extending the center of the heated sheet of thermoplastic material into the interior of an involute female mold to form an elongate conical shaped piece of material having an interior cavity;
  controlling the planar movement of the thermoplastic material radially inwardly towards the center thereof by controlling the compression exerted on the thermoplastic material by said platens;
  monitoring the movement of the thermoplastic material radially inwardly toward the center of said sheet;
  increasing the compression between the opposed platens responsively to said monitoring as the thermoplastic material moves radially inwardly toward the center thereof;
  clamping the thermoplastic material between the platens to prevent continued radially inward movement thereof responsive to movement of the material a preselected distance toward the center; and
  pressurizing the interior cavity of the elongate conical shaped piece of thermoplastic material without substantially reheating said material to expand and press the thermoplastic material against the interior surface of the involute female mold.

10. A method as recited in claim 9 wherein said heating comprises the steps of placing the sheet of thermoplastic material in an oven between opposed infrared heating elements, heating the sheet of thermoplastic material with said infrared heating elements, and controlling the ambient temperature within the oven during said heating to control the heat loss and gain of the thermoplastic material.

11. A method for forming involute plastic articles comprising:
  placing a sheet of thermoplastic material in an oven between opposed arrays of infrared heating elements;
  heating the sheet of thermoplastic material with said infrared heating elements;
  simultaneously drawing air from outside the oven into the oven, venting heated air from the oven, and controlling said venting to control the heat loss and gain of the thermoplastic material;
  planarly supporting the heated sheet of thermoplastic material by compressing the material between opposed platens which allow for transverse movement of the center of said heated sheet of thermoplastic material with respect to said platens, the compression between said opposed platens generally allowing for controlled planar movement of the thermoplastic material radially inwardly toward the center thereof;
  transversely extending the center of the heated sheet of thermoplastic material into the interior of an involute female mold so that said material is drawn radially inwardly between the platens towards the center of the sheet and extend transversely at said center into an elongate conical shaped piece having an interior cavity;

monitoring the movement of the thermoplastic material radially inwardly toward the center of said sheet;

increasing the compression between the opposed platens responsively to said monitoring so that said compression is increased responsively to the movement of the thermoplastic material as said material moves toward the center thereof;

clamping the thermoplastic material between the platens to prevent continued radially inward movement thereof responsive to movement of the material a preselected distance toward the center; and pressurizing the interior cavity of the elongate conical shaped piece of thermoplastic material without substantially reheating said material to expand and press the thermoplastic material against the interior surface of the involute female mold.

12. A method for forming involute plastic articles comprising:

heating a sheet of thermoplastic material in a controlled manner so as to maintain proper ambient conditions;

planarly supporting the heated sheet of thermoplastic material by placing the material between opposed platens which allow for transverse movement of the center of said heated sheet of thermoplastic material with respect to said platens, the compression between said opposed platens generally allowing for controlled planar movement of the thermoplastic material radially inwardly towards the center thereof;

transversely extending the center of the heated sheet of thermoplastic material into the interior of an involute female mold so that said material is drawn radially inwardly between the platens toward the center of the sheet and extended transversely at said center into an elongate conical shaped piece having an interior cavity;

monitoring the movement of the thermoplastic material radially inwardly toward the center of said sheet;

increasing the compression between the opposed platens responsively to said monitoring so that said compression is increased responsively to the movement of the thermoplastic material as the material moves radially inwardly toward the center thereof; and injecting a gas under pressure into the interior cavity of the elongate conical shaped piece of thermoplastic material to expand and press the thermoplastic material against the interior surface of the involute female mold.

13. A method as recited in claim 12 wherein said increasing step includes clamping the thermoplastic material between the platens to prevent continued radially inward movement thereof responsive to movement of the material a preselected distance toward the center.

14. A method as recited in claim 12 wherein said heating comprises the steps of placing the sheet of thermoplastic material in an oven between opposed infrared heating elements, heating the sheet of thermoplastic material with said infrared heating elements, and controlling the ambient temperature within the oven during said heating to control the heat loss and gain of the thermoplastic material.

* * * * *